US009625125B1

(12) United States Patent
Bryant et al.

(10) Patent No.: US 9,625,125 B1
(45) Date of Patent: Apr. 18, 2017

(54) ADJUSTABLE LUMINAIRE

(71) Applicants: Christopher Michael Bryant, Social Circle, GA (US); James Richard Christ, Peachtree City, GA (US); Christopher Gerard Ladewig, Fayetteville, GA (US); Travis Liam Johnson, Fayetteville, GA (US)

(72) Inventors: Christopher Michael Bryant, Social Circle, GA (US); James Richard Christ, Peachtree City, GA (US); Christopher Gerard Ladewig, Fayetteville, GA (US); Travis Liam Johnson, Fayetteville, GA (US)

(73) Assignee: Cooper Technologies Company, Houston, TX (US)

( * ) Notice: Subject to any disclaimer, the term of this patent is extended or adjusted under 35 U.S.C. 154(b) by 43 days.

(21) Appl. No.: 14/580,011

(22) Filed: Dec. 22, 2014

Related U.S. Application Data

(60) Provisional application No. 61/976,719, filed on Apr. 8, 2014.

(51) Int. Cl.
*B60Q 1/26* (2006.01)
*F21V 1/00* (2006.01)
(Continued)

(52) U.S. Cl.
CPC ................ *F21V 14/06* (2013.01); *F21V 5/04* (2013.01); *F21V 7/0066* (2013.01); *F21V 21/30* (2013.01); *F21Y 2101/02* (2013.01)

(58) Field of Classification Search
CPC . F21K 9/58; F21V 14/00; F21V 14/06; F21V 23/0471; F21V 5/00; F21V 5/08;
(Continued)

(56) References Cited

U.S. PATENT DOCUMENTS 4,549,366 A * 10/1985 Gerding .................. D05C 1/04 248/185.1
6,042,251 A * 3/2000 McCarthy .............. F21S 8/033 362/147
(Continued)

OTHER PUBLICATIONS

International Search Report for PCT/US2015/024767, mailed Jul. 9, 2015.
(Continued)

*Primary Examiner* — Peggy Neils
*Assistant Examiner* — Erin Kryukova
(74) *Attorney, Agent, or Firm* — King & Spalding LLP

(57) ABSTRACT

A luminaire can comprise a housing that comprises a flat surface or platform. The platform can comprise one or more apertures. One or more light modules can be disposed in the aperture or apertures, so that each light module is set into the platform, for example. Each light module can be rotated within its aperture. Each light module can emit a pattern of illumination that is biased relative to its axis of light module rotation, for example. Accordingly, the illumination emitted by each light module can be aimed in various directions by rotating the light module. Adjusting the rotational orientation of each light module can thus control where the luminaire directs the illumination pattern.

17 Claims, 17 Drawing Sheets

(51) Int. Cl.

| | |
|---|---|
| ***F21V 11/00*** | (2015.01) |
| ***F21S 8/00*** | (2006.01) |
| ***F21V 3/00*** | (2015.01) |
| ***F21V 5/00*** | (2015.01) |
| ***F21V 14/06*** | (2006.01) |
| ***F21V 21/30*** | (2006.01) |
| ***F21V 5/04*** | (2006.01) |
| ***F21V 7/00*** | (2006.01) |
| *F21Y 101/02* | (2006.01) |

(58) Field of Classification Search

CPC .......... F21V 5/04; F21V 5/045; F21V 7/0091; F21V 14/04; F21V 15/01; F21V 31/005; F21W 2131/103; F21W 2131/101; F21W 2131/1005; F21W 2131/107; F21Y 2101/02; F21S 8/037; F21S 8/085; F21S 8/086; F21S 8/088

See application file for complete search history.

(56) References Cited

U.S. PATENT DOCUMENTS

| | | | | |
|---|---|---|---|---|
| 6,082,878 | A | 7/2000 | Doubek et al. | |
| 6,183,104 | B1 * | 2/2001 | Ferrara | F21S 2/005 362/145 |
| 6,193,395 | B1 * | 2/2001 | Logan | F21S 9/022 362/269 |
| 6,969,181 | B1 * | 11/2005 | Bailey | F21S 2/00 362/147 |
| 7,284,880 | B1 | 10/2007 | Steele | |
| 7,674,018 | B2 | 3/2010 | Holder et al. | |
| 8,002,435 | B2 | 8/2011 | Laporte | |
| 2006/0193151 | A1 * | 8/2006 | Quan | F21S 8/033 362/640 |
| 2008/0266856 | A1 | 10/2008 | Chien | |
| 2009/0310356 | A1 * | 12/2009 | Laporte | F21V 5/007 362/239 |
| 2010/0195326 | A1 * | 8/2010 | Boxler | F21K 9/00 362/235 |
| 2013/0069100 | A1 * | 3/2013 | Ahmed | F21V 15/01 257/99 |
| 2014/0340872 | A1 * | 11/2014 | Campbell | A61H 33/6063 362/96 |
| 2015/0176831 | A1 * | 6/2015 | Zhang | F21V 23/06 362/294 |
| 2015/0369430 | A1 * | 12/2015 | Vamberi | F21K 9/58 362/235 |

OTHER PUBLICATIONS

International Search Report for PCT/US2015/024770, mailed Jul. 9, 2015.

* cited by examiner

FIG. 6B
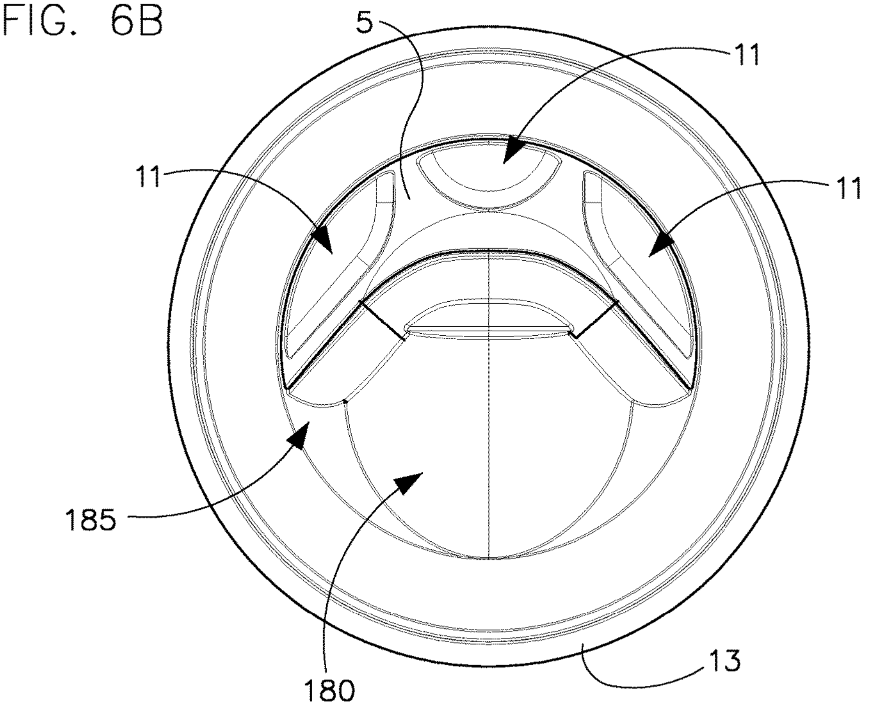
FIG. 6C
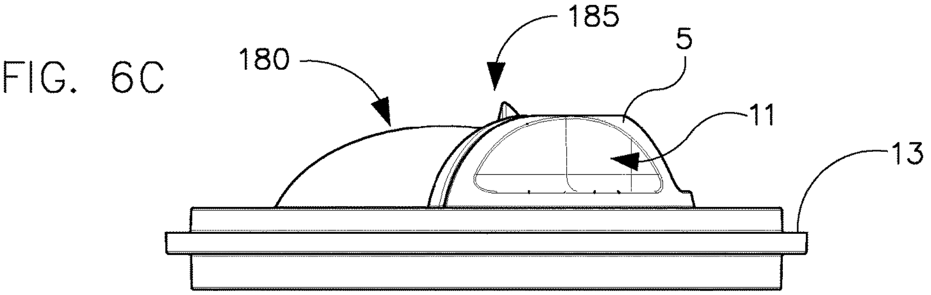
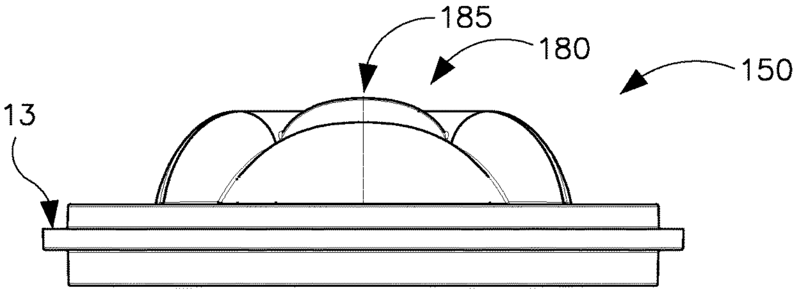
FIG. 6D

FIG. 7A
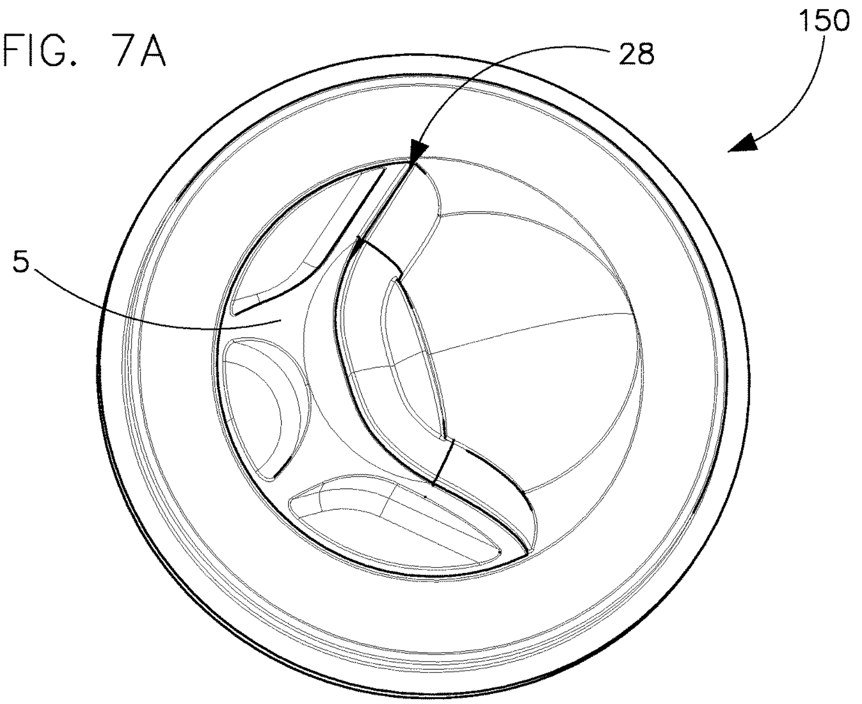
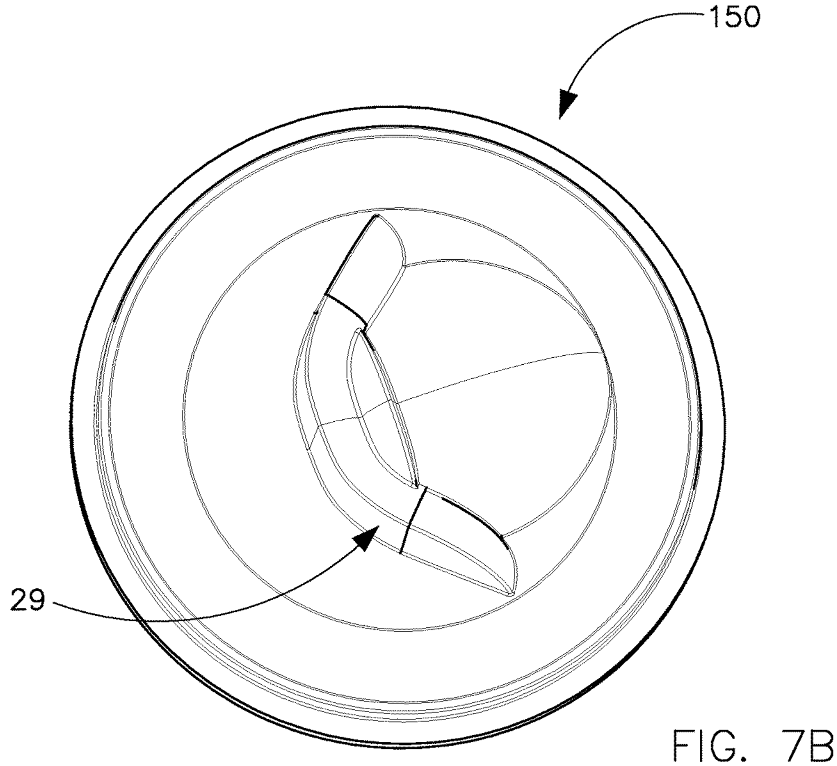
FIG. 7B

FIG. 8A
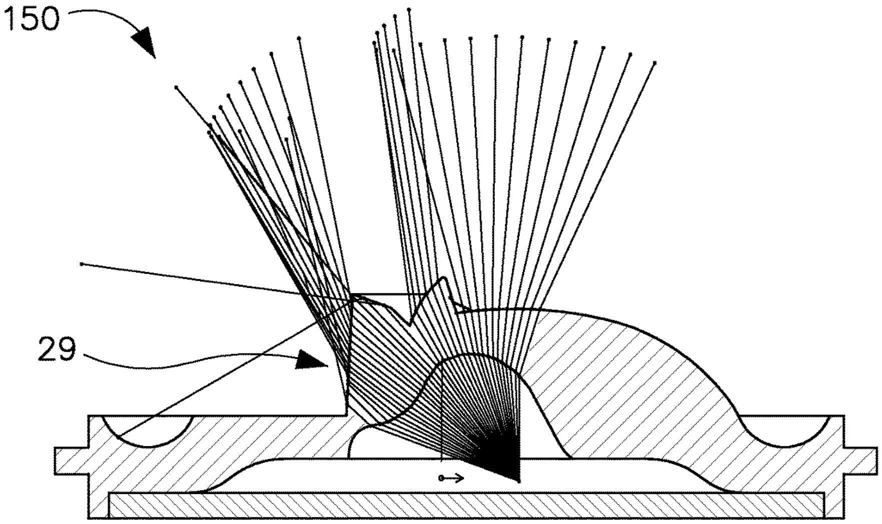
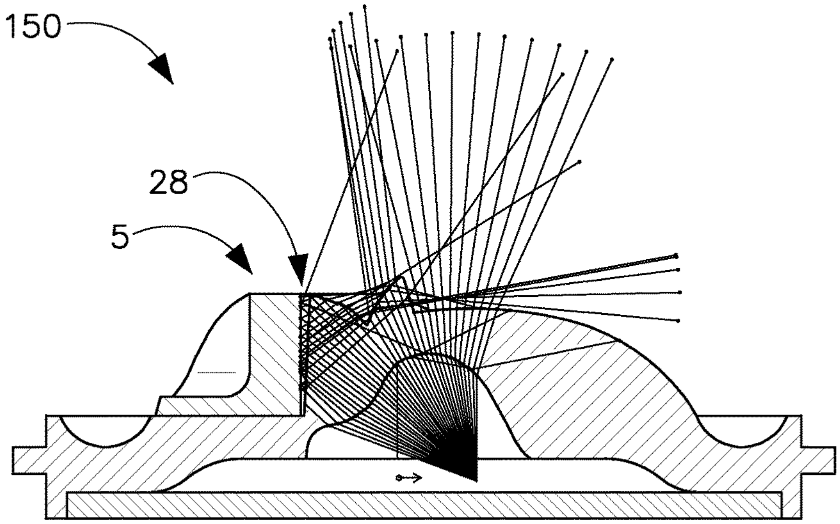
FIG. 8B

FIG. 10A
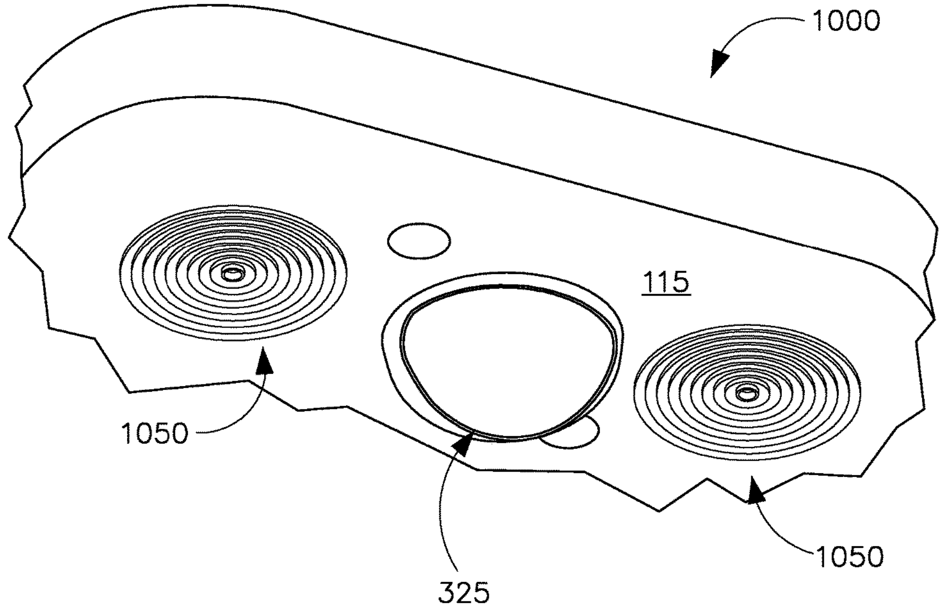
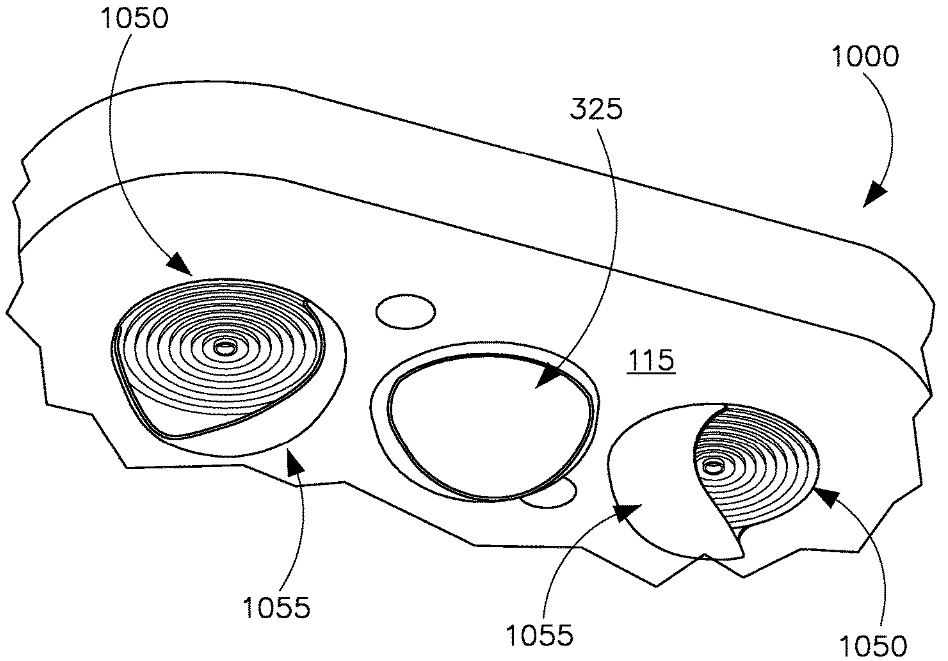
FIG. 10B

FIG. 10C
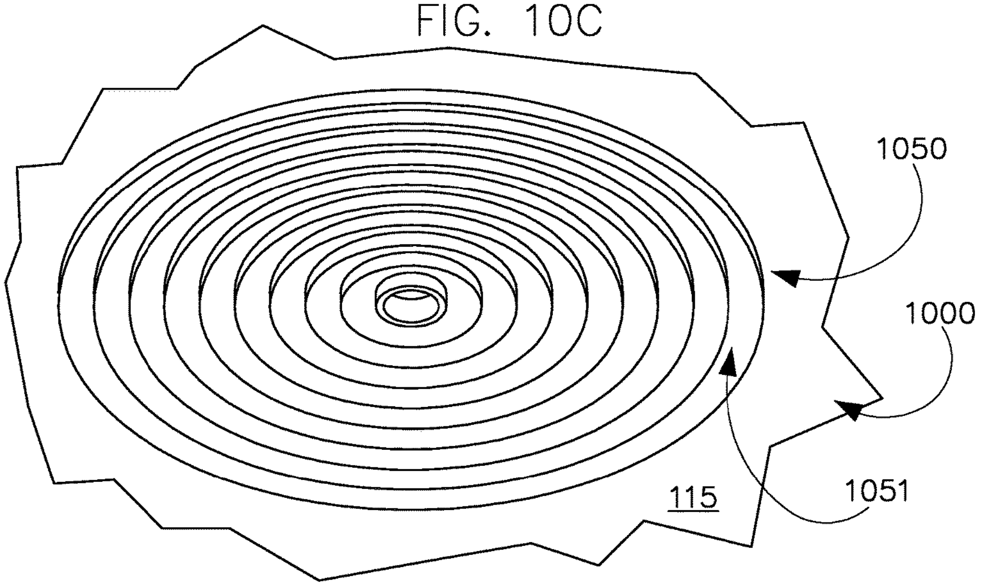
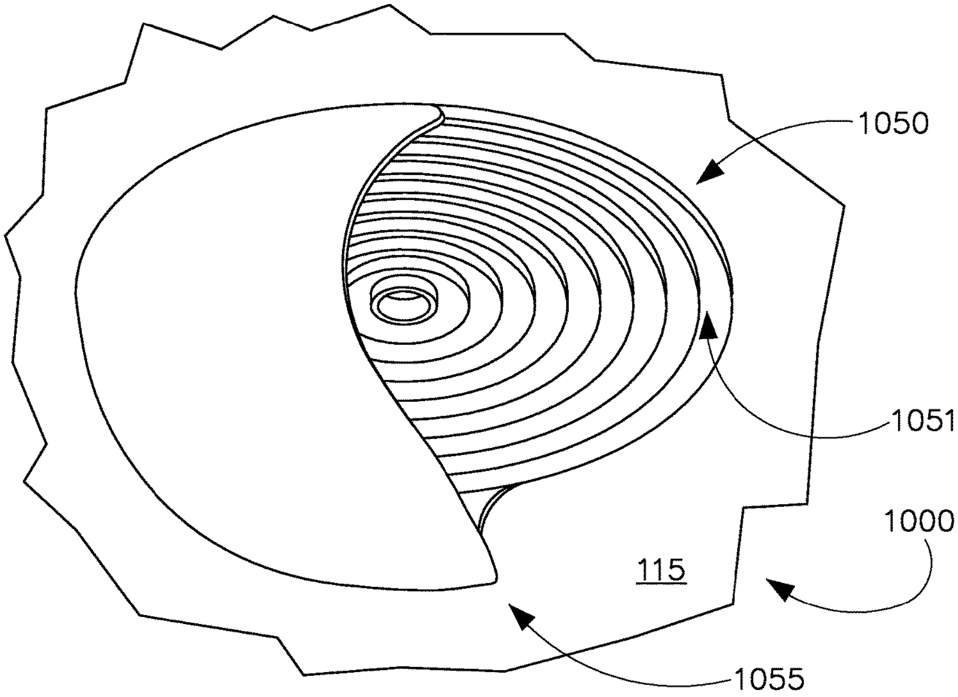
FIG. 10D

ADJUSTABLE LUMINAIRE

CROSS REFERENCE TO RELATED APPLICATIONS

The present application claims priority to U.S. Provisional Patent Application No. 61/976,719 filed Apr. 8, 2014 in the name of Christopher Michael Bryant, Westly Davis Hetrick, and Christopher Gerard Ladewig and entitled "Adjustable Luminaire," the entire contents of which are hereby incorporated herein by reference. This application is related to U.S. Non-Provisional patent application Ser. No. 14/580,020, filed concurrently with the present application, having an overlapping inventor list, and entitled "Adjustable Light Module," the entire contents of which are hereby incorporated herein by reference.

TECHNICAL FIELD

Embodiments of the technology relate generally to luminaires, and more particularly to a luminaire in which a rotatable light module is inset in a raised surface, wherein the rotatable light module may incorporate one or more light emitting diodes (LEDs).

BACKGROUND

Interest in adoption of light emitting diode technology for illumination is escalating, as light emitting diodes offer advantages over incandescent lighting and other approaches to converting electrical energy into luminous energy. Representative advantages can include longevity and efficiency. Light emitting diodes often come in compact packages that are quite different from conventional incandescent light bulbs or fluorescent bulbs. Additionally, light emitting diodes typically emit light in a quite different geometry than most other conventional illumination sources.

Improved technologies for utilizing light emitting diodes to generate illumination are needed. For example, new technology is needed for configurable, adjustable, or flexible illumination patterns. Need exists for improved luminaires and light modules that can leverage the potential advantages of light emitting diodes. A capability addressing one or more such needs, or some other related deficiency in the art, would support improved illumination systems, better economics, and/or wider use of light emitting diodes.

SUMMARY

A housing of a luminaire can comprise a platform. The platform can comprise an aperture. A light module can be disposed in the aperture, so that the light module is set into the platform, for example. The light module can be rotated in whole or part about an axis within the aperture. The light module can comprise a light emitting diode and an optic that rotate together, or a light emitting diode that remains stationary while the optic rotates, for example. The light module can emit a pattern of illumination that is skewed relative to the axis of light module rotation, for example. Adjusting the rotational orientation of the light module can thus control where the illumination pattern is directed.

The foregoing discussion of luminaires is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

BRIEF DESCRIPTION OF THE DRAWINGS

FIGS. 6A, 6B, 6C, and 6D (collectively FIG. 6) illustrate four views of a rotatable light module according to some example embodiments of the present disclosure.

FIGS. 7A and 7B respectively illustrate a rotatable light module with and without a light-blocking shield according to some example embodiments of the present disclosure.

FIGS. 8A and 8B respectively illustrate cross sectional views of a rotatable light module with and without a light-blocking shield, with overlaid rays according to some example embodiments of the present disclosure.

FIGS. 10A, 10B, 10C, and 10D (collectively FIG. 10) illustrate views of a luminaire comprising two light modules according to some example embodiments of the present disclosure.

Figure 1A:
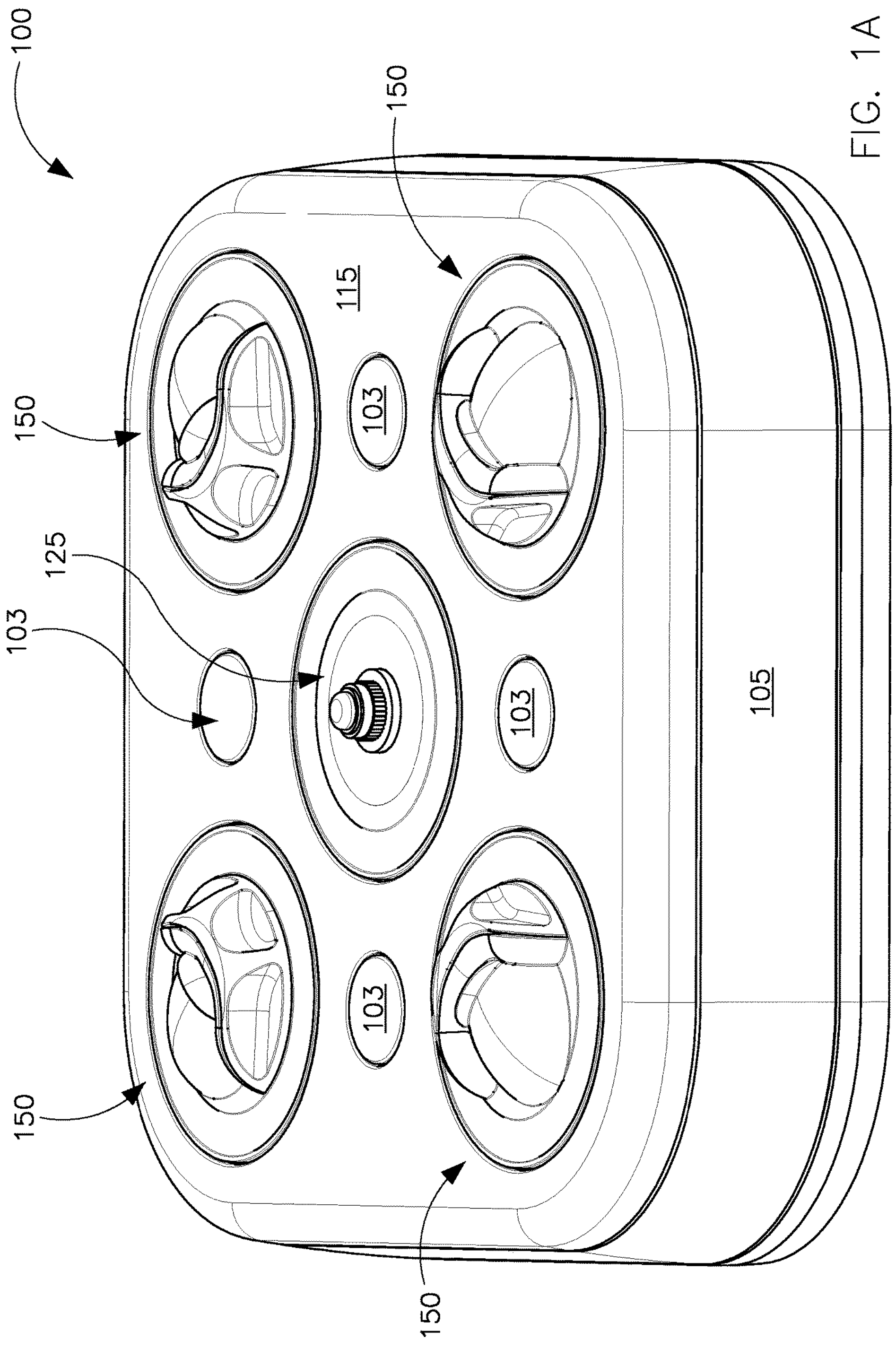
FIGS. 1A and 1B (collectively FIG. 1) illustrate two views of a luminaire comprising four rotatable light modules according to some example embodiments of the present disclosure.

Many aspects of the technology can be better understood with reference to the above drawings. The elements and features shown in the drawings are not necessarily to scale, emphasis being placed upon clearly illustrating the principles of exemplary embodiments of the present technology. Moreover, certain dimensions may be exaggerated to help visually convey such principles.

DETAILED DESCRIPTION OF EXAMPLE EMBODIMENTS

A rotatable light module can be mounted at an enclosure, for example of a luminaire. The rotatable light module can emit light along one axis and rotate about another axis. The two axes can be skewed relative to one another, for example so that the two axes are oriented other than parallel to one another. In some example embodiments, the rotatable light module comprises a stationary light emitting diode and a rotating optic. In some example embodiments, the rotatable light module comprises a light emitting diode and an optic that rotate together.

Figure 4:
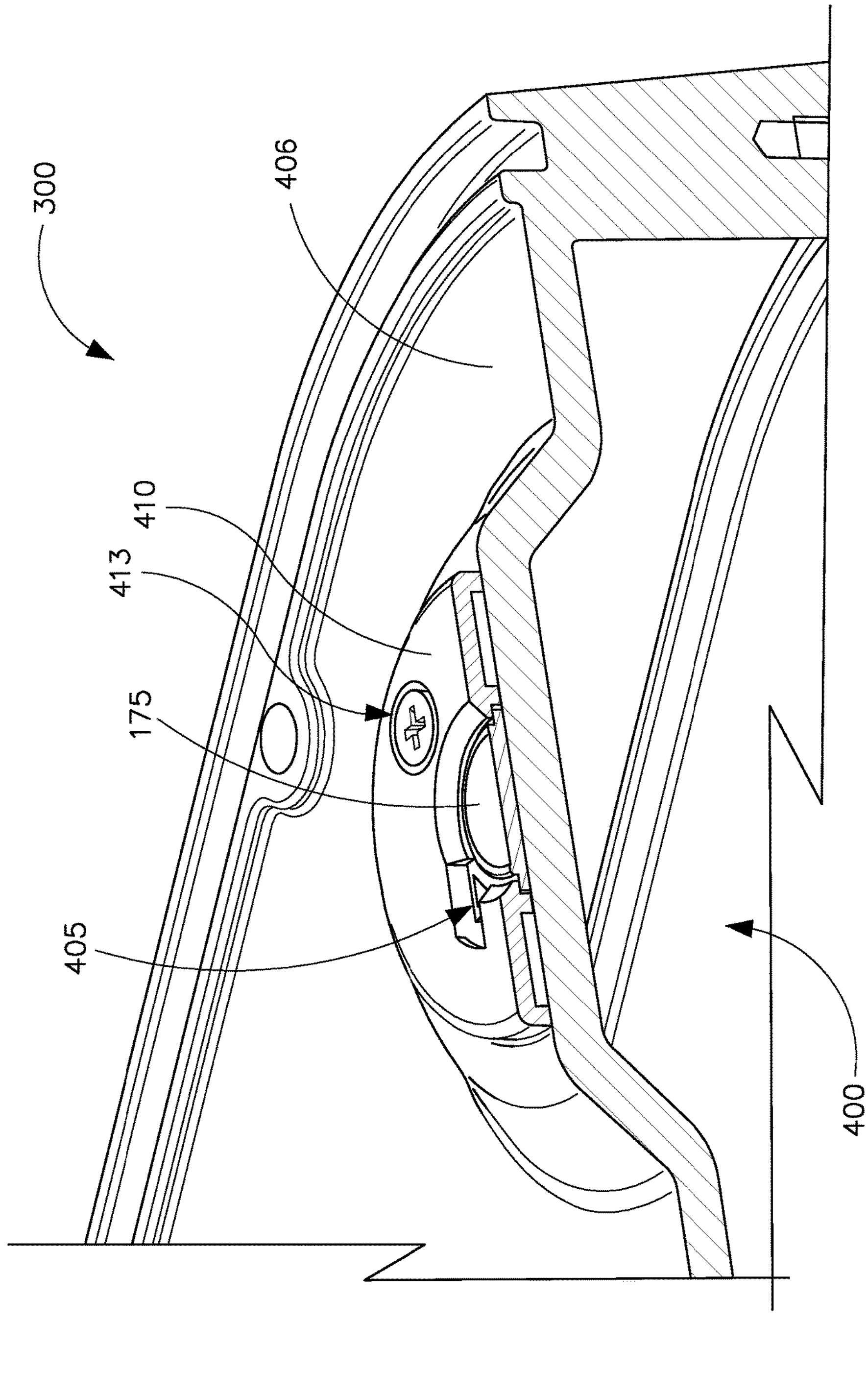
FIG. 4 illustrates a perspective view of a cross section of a light emitting diode mounting system for a luminaire according to some example embodiments of the present disclosure.
Figure 5:
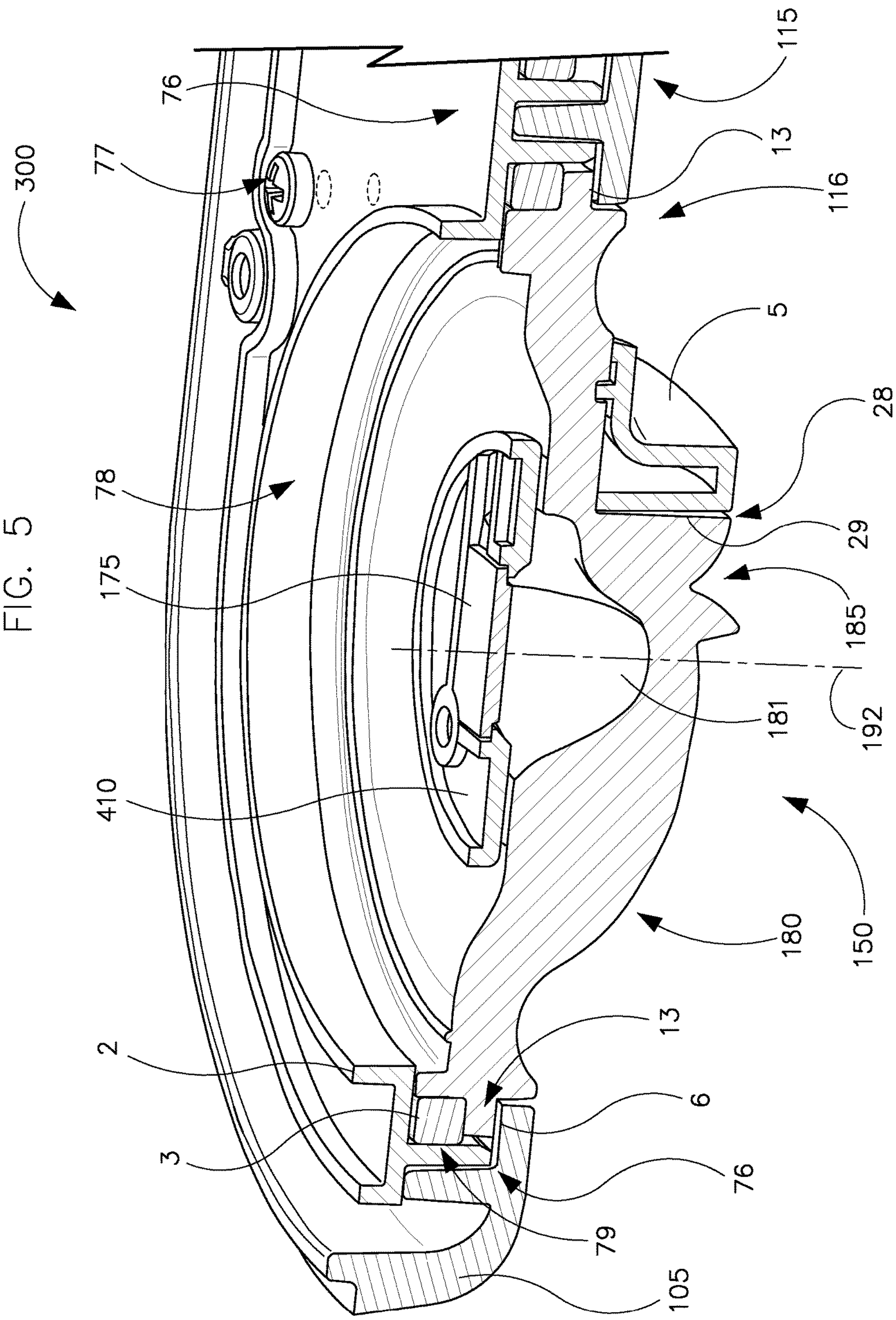
FIG. 5 illustrates a perspective view of a cross section of a rotatable light module mounted in an aperture of a luminaire according to some example embodiments of the present disclosure.
Figure 9:
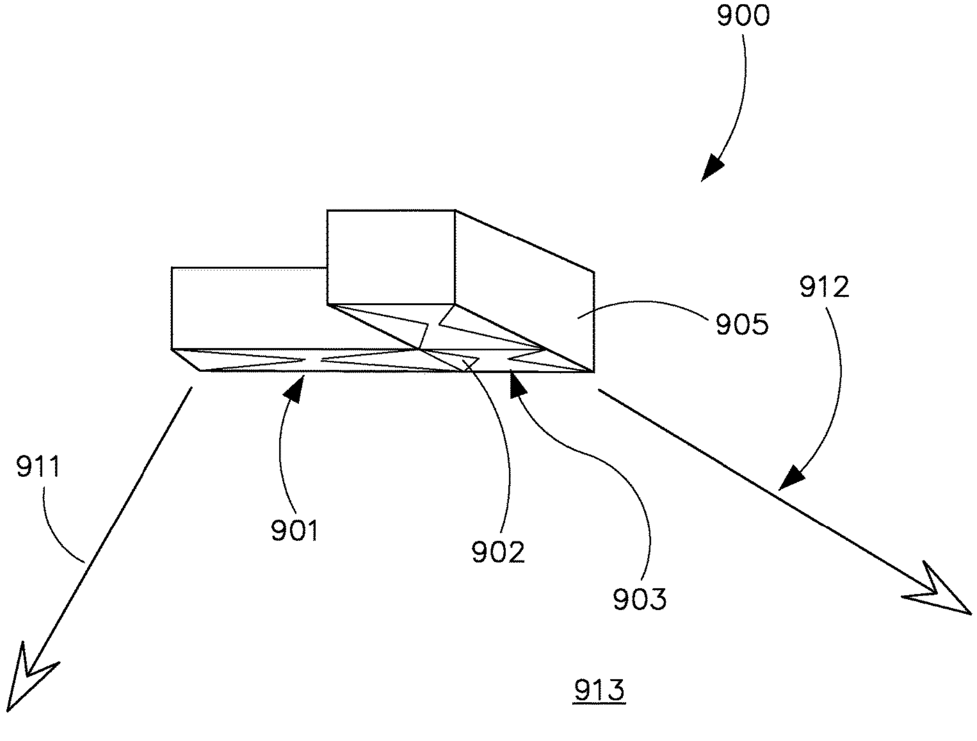
FIG. 9 illustrates a perspective of a luminaire comprising three recessed light modules according to some example embodiments of the present disclosure.

Some representative embodiments will be described more fully hereinafter with example reference to the accompanying drawings that illustrate some representative embodiments of the disclosure. FIGS. 1, 2, and 3 describe three representative embodiments of luminaires incorporating a rotatable light module. FIGS. 4 and 5 describe representative embodiments for mounting a rotatable light module. FIGS. 6, 7, and 8 describe a representative embodiment of a rotatable light module. FIG. 9 describes another representative embodiment of a luminaire. FIG. 10 describes another representative luminaire embodiment.

The technology may, however, be embodied in many different forms and should not be construed as limited to the embodiments set forth herein; rather, these embodiments are provided so that this disclosure will be thorough and complete, and will fully convey the scope of the technology to those appropriately skilled in the art. The elements and features shown in the drawings are not necessarily drawn to scale, emphasis instead being placed upon clearly illustrating principles of the embodiments. Additionally, certain dimensions or positionings may be exaggerated to help visually convey certain principles. In the drawings, similar reference numerals among different figures designate like or corresponding, but not necessarily identical, elements across the various views.

Referring now to the drawings, FIGS. 1, 2, and 3 illustrate three example luminaires 100, 200, 300 that comprise example rotatable light modules 150 in accordance with some embodiments of the disclosure.

Figure 1B:
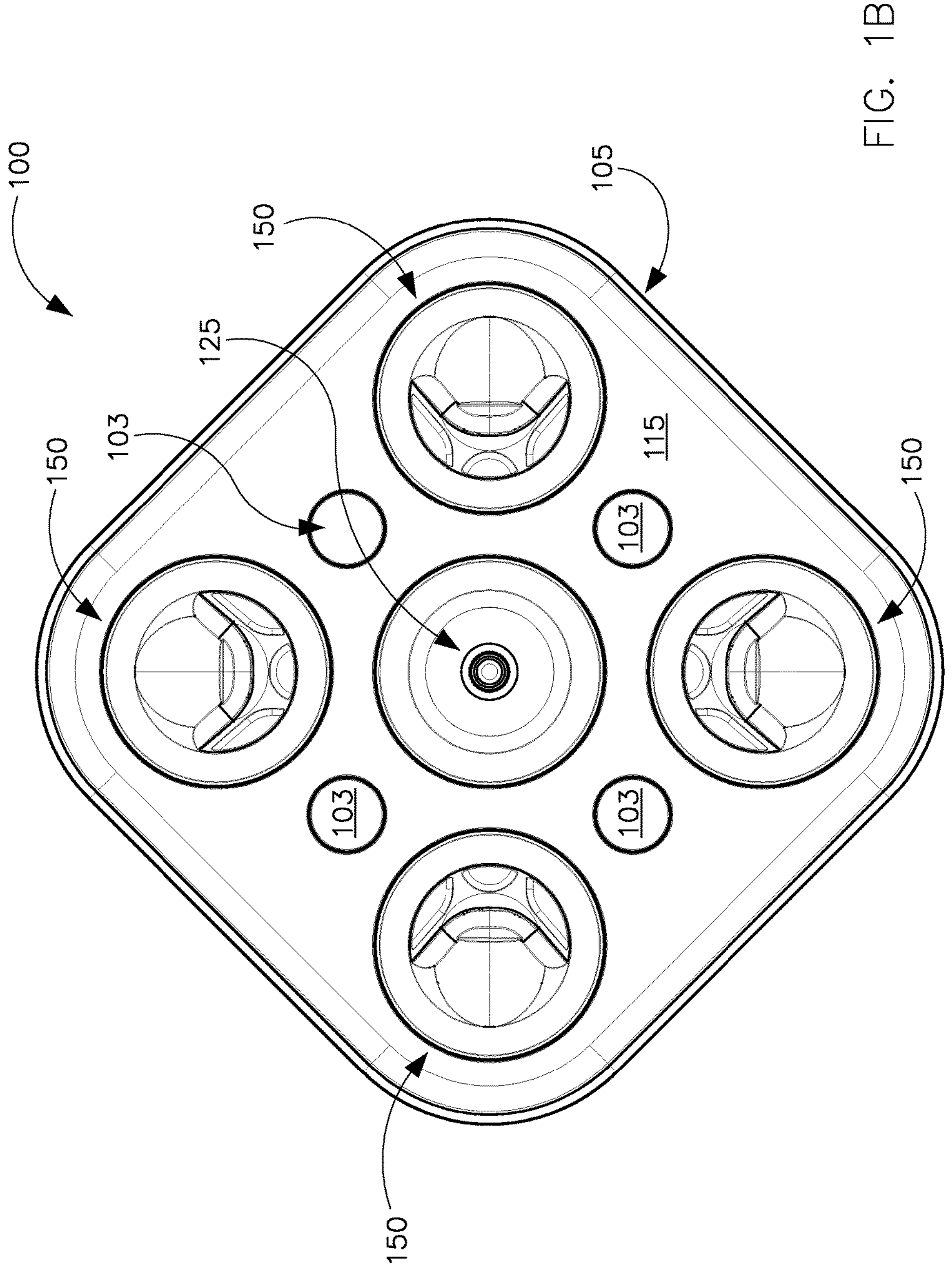

FIG. 1A illustrates a perspective view of the example luminaire 100 that incorporates four rotatable light modules 150. FIG. 1B illustrates a view of the example luminaire 100 that shows the front or light-emitting side.

Figure 2A:
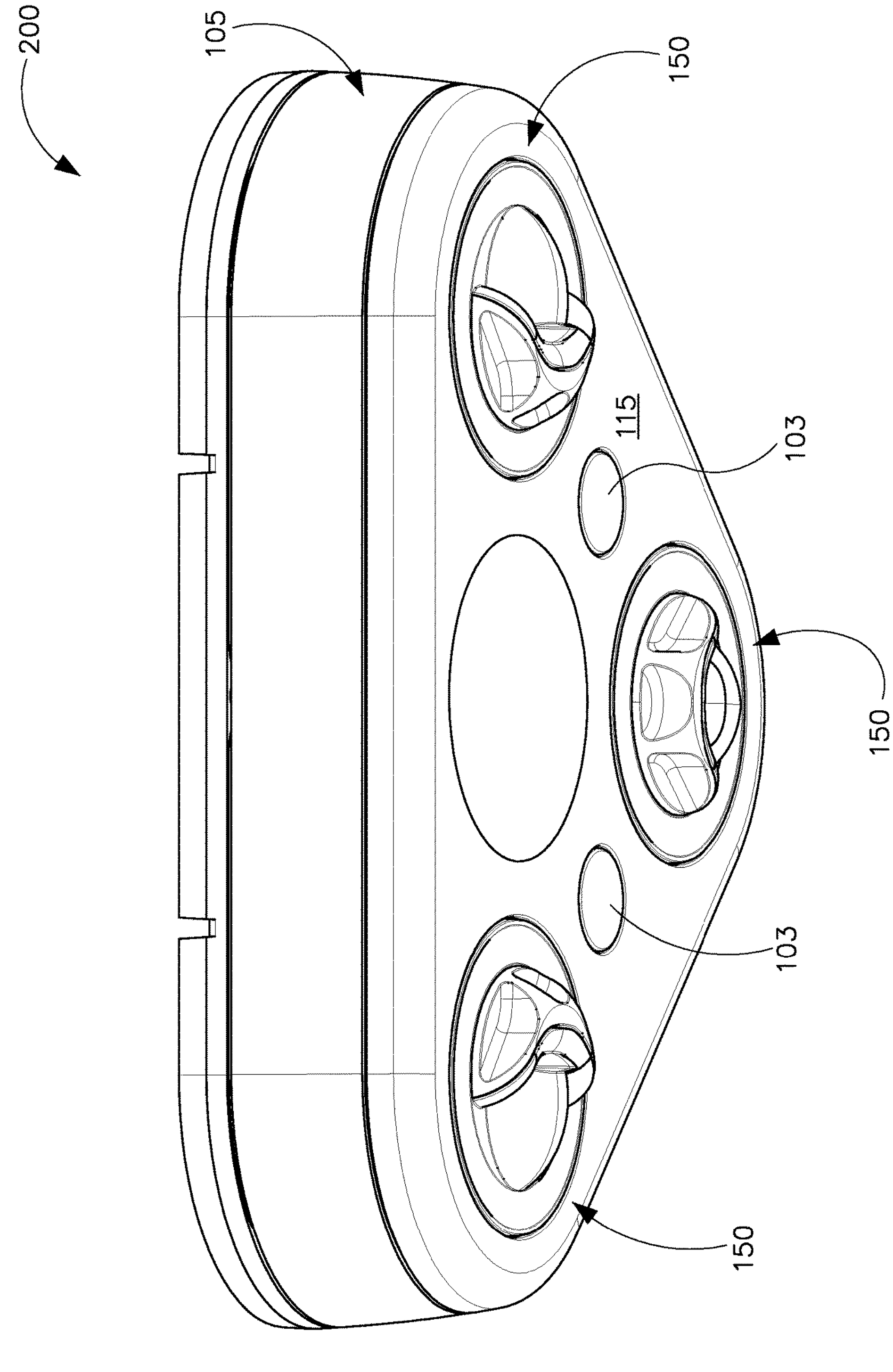
FIGS. 2A and 2B (collectively FIG. 2) illustrate two views of a luminaire comprising three rotatable light modules according to some example embodiments of the present disclosure.
Figure 2B:
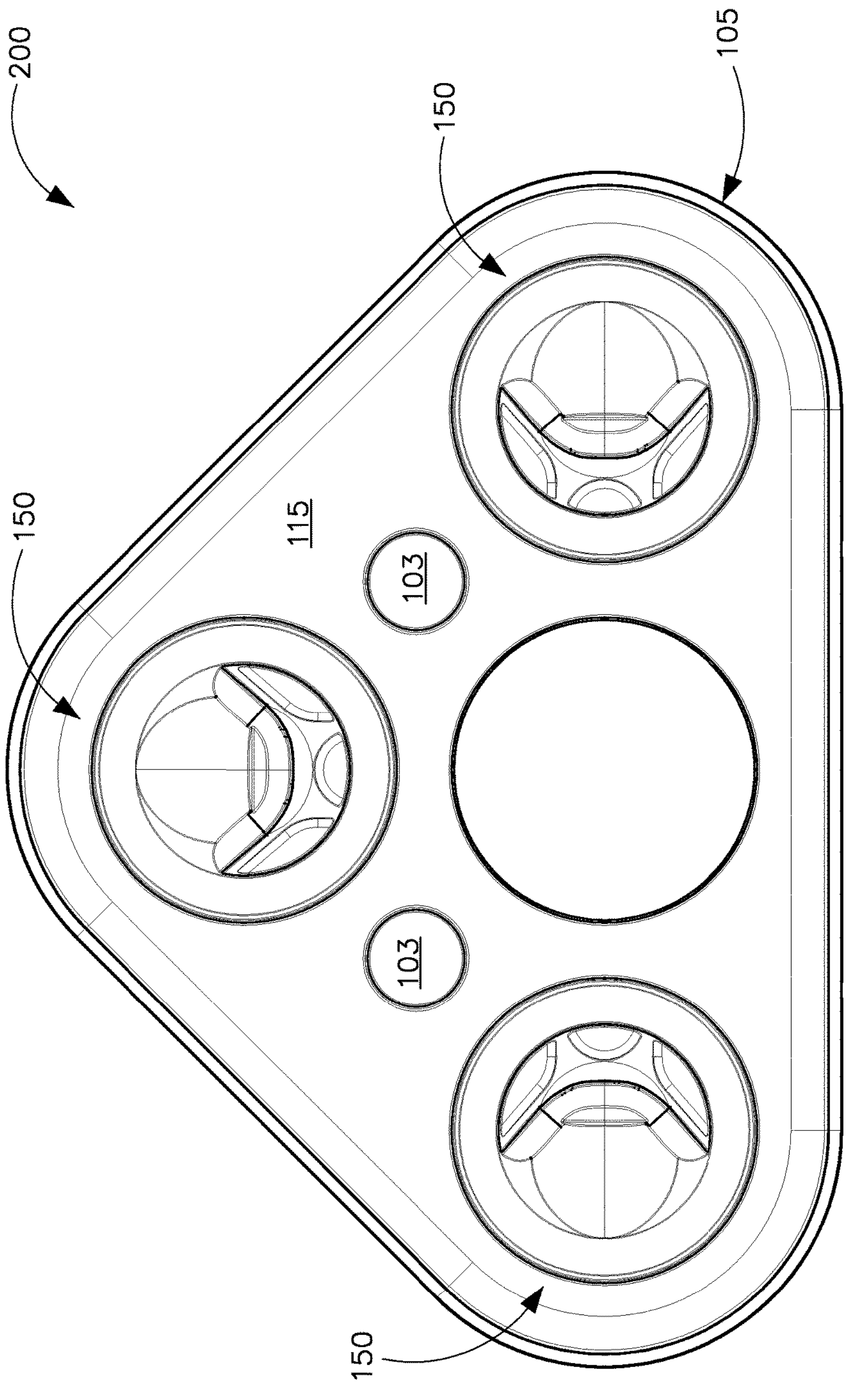

FIG. 2A illustrates a perspective view of the example luminaire 200 that incorporates three rotatable light modules 150. FIG. 2B illustrates a view of the example luminaire 200 that shows the front or light-emitting side.

Figure 3A:
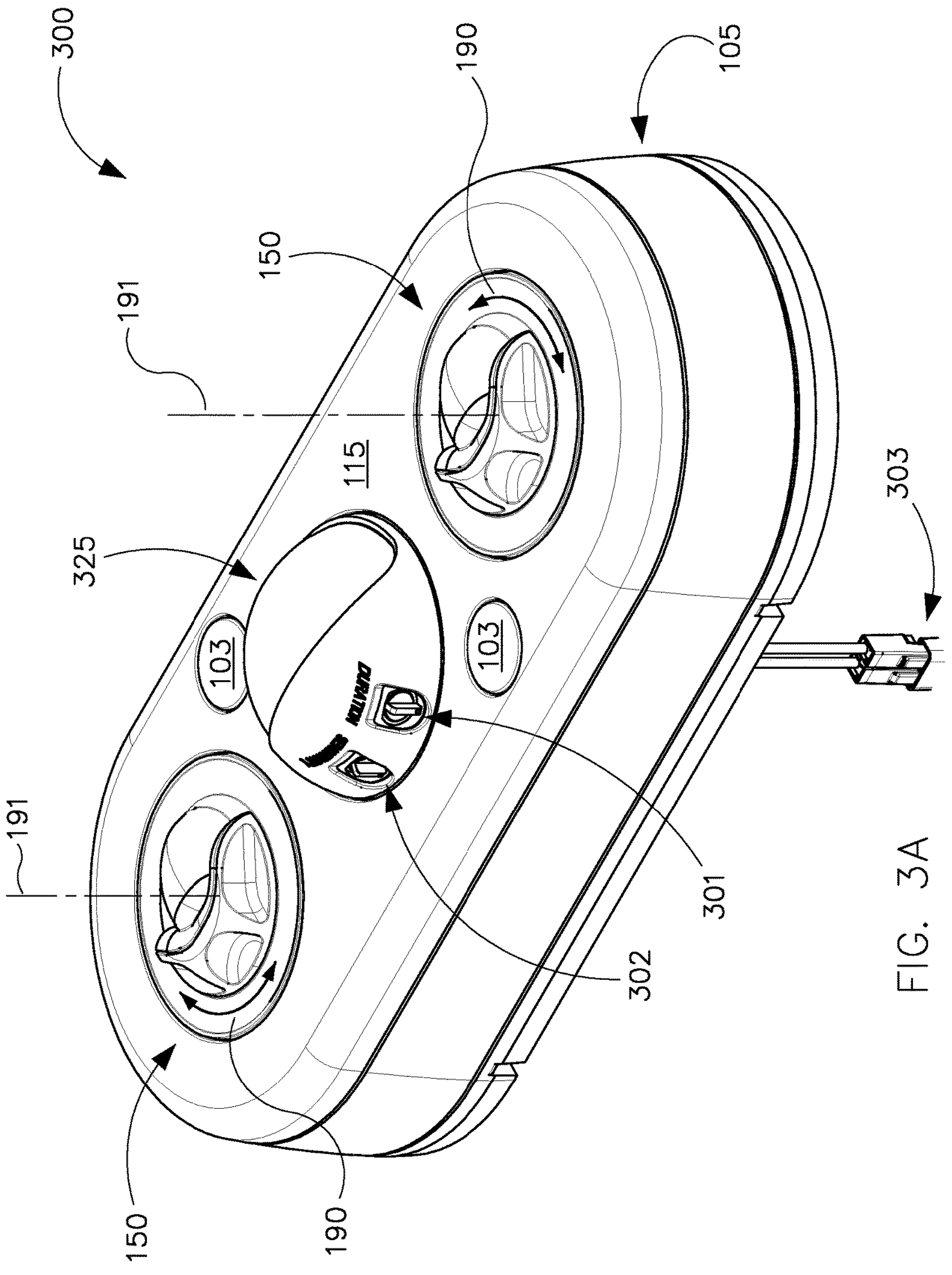
FIGS. 3A, 3B, 3C, and 3D (collectively FIG. 3) illustrate four views of a luminaire comprising two rotatable light modules according to some example embodiments of the present disclosure.
Figure 3B:
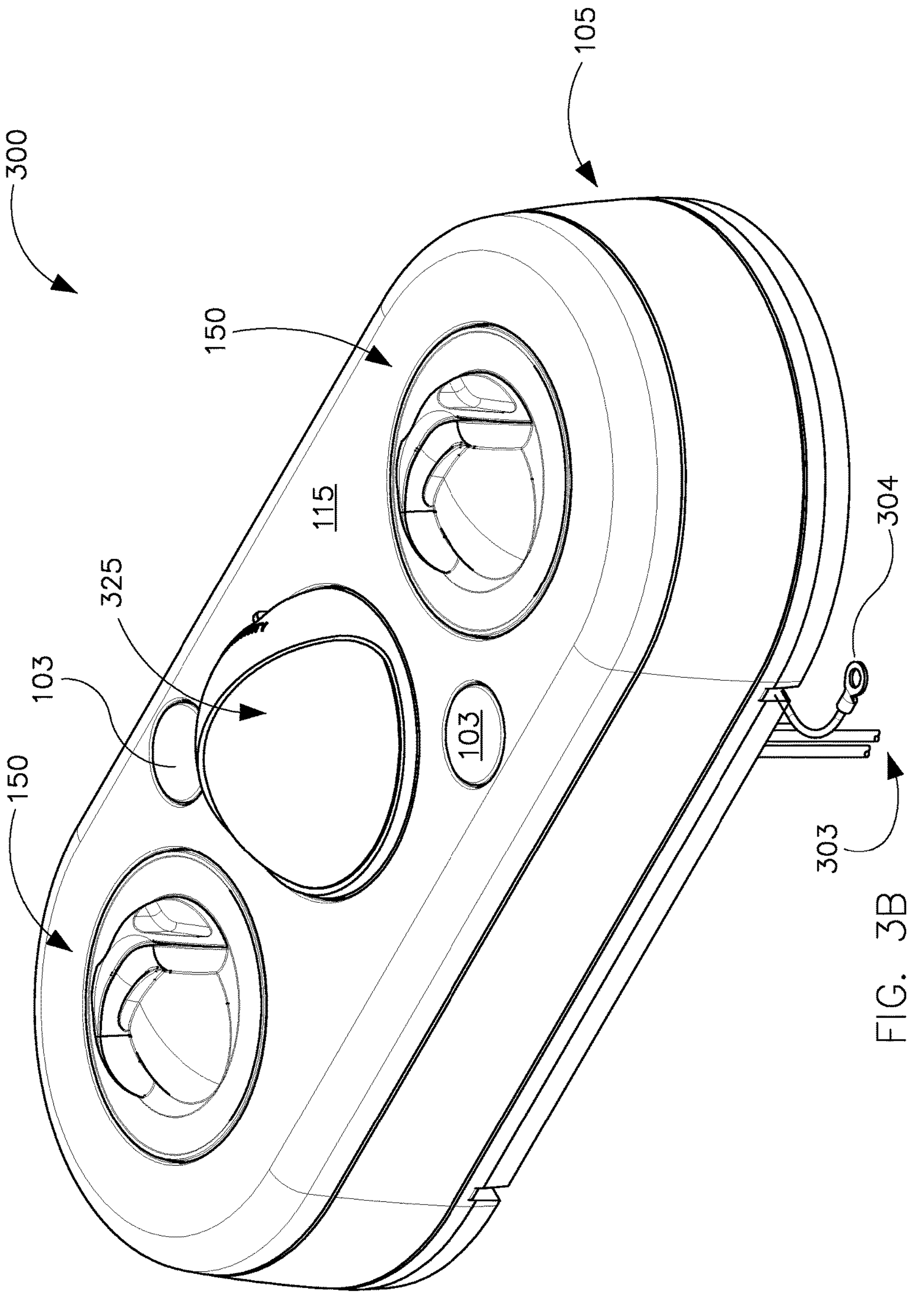
Figure 3C:
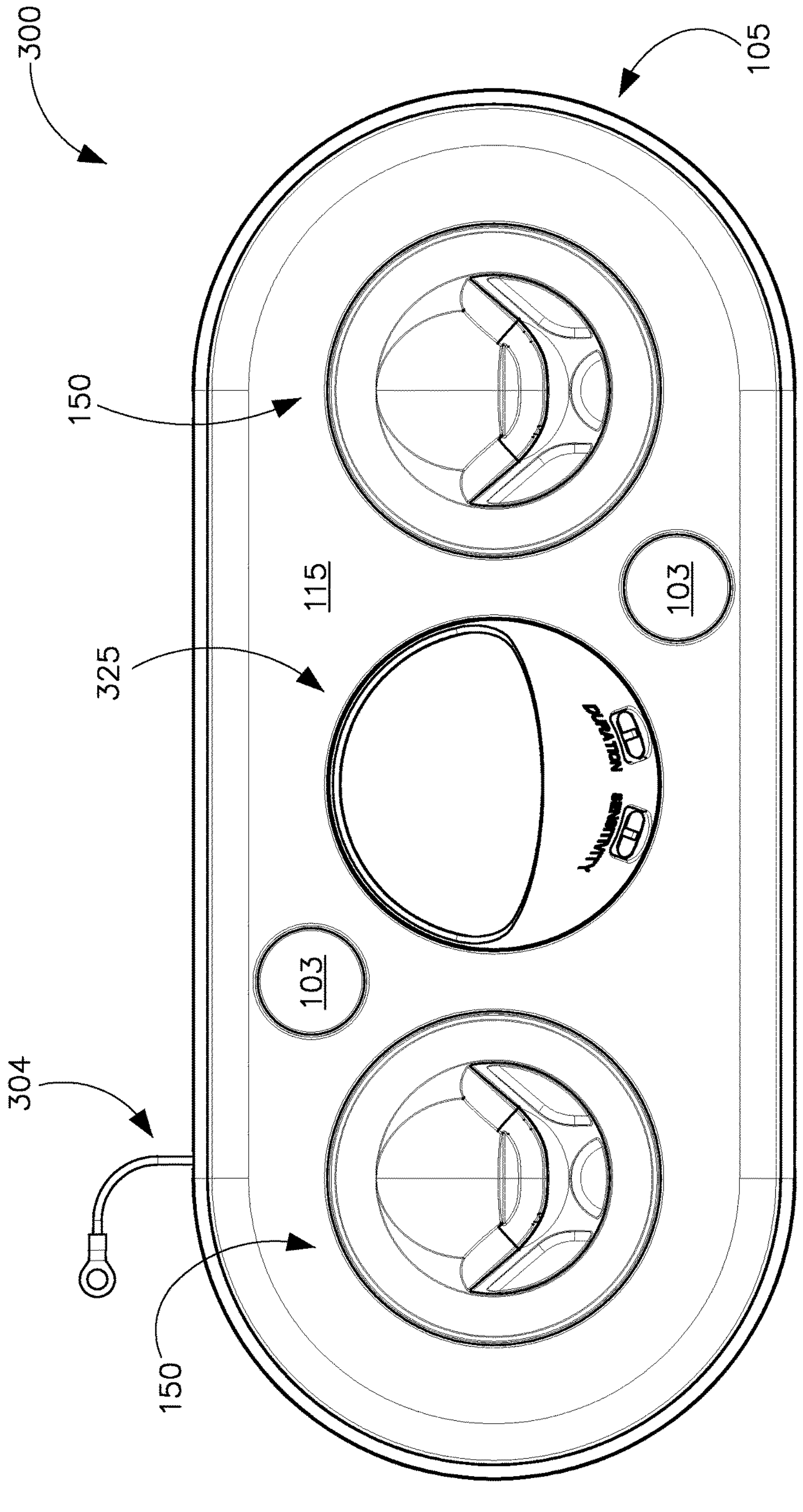
Figure 3D:
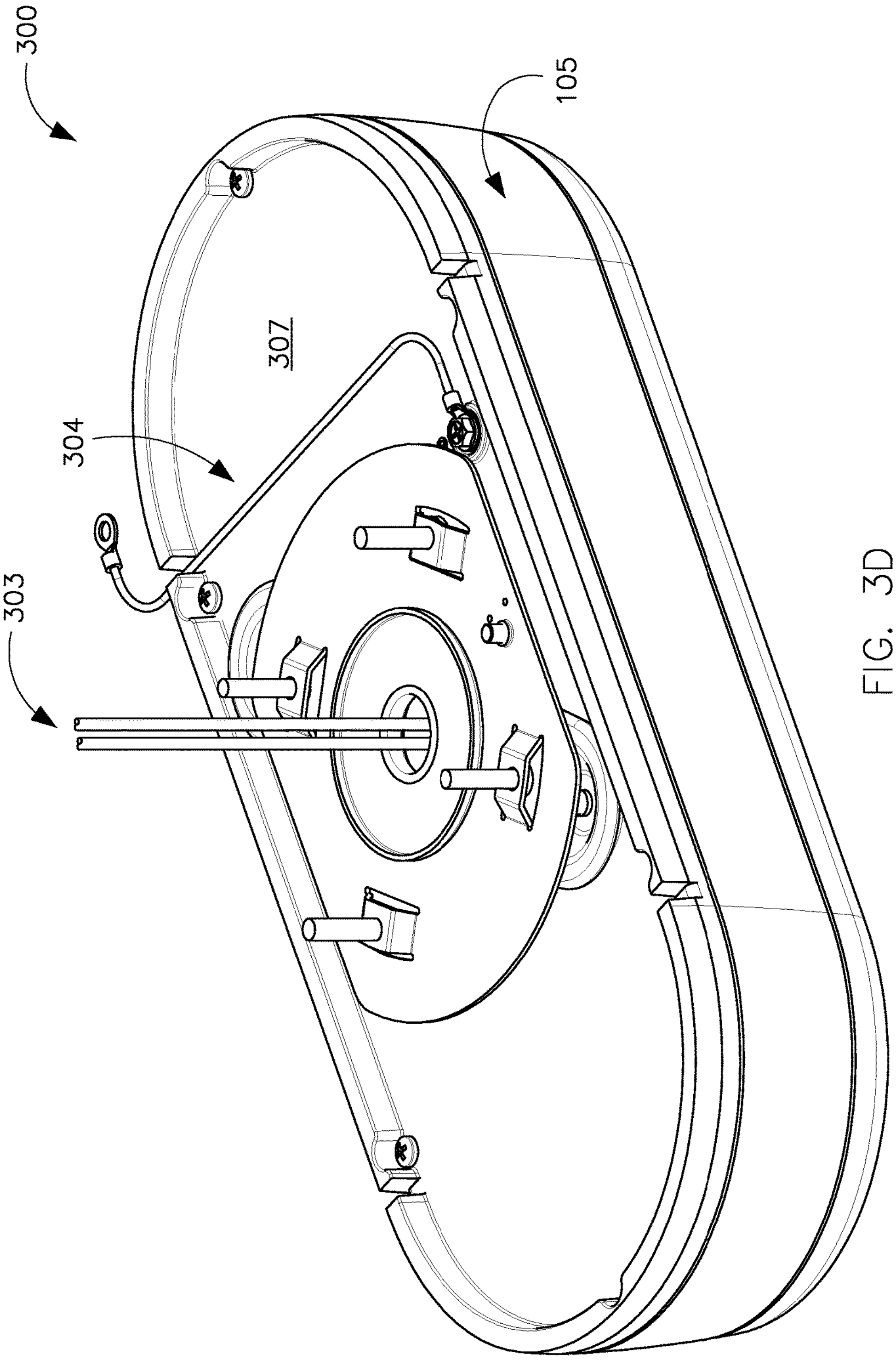

FIG. 3A illustrates a perspective view of the example luminaire 300 that incorporates two rotatable light modules 150. FIG. 3B illustrates another perspective view of the example luminaire 300, from a vantage point on the opposite side of the luminaire 300 relative to the view of FIG. 3A. FIG. 3C illustrates a view of the example luminaire 300 that shows the front or light-emitting side. FIG. 3D illustrates a perspective view of the example luminaire 300, showing the rear side that is opposite the light-emitting side.

In some embodiments, the luminaire 100, 200, 300 can be mounted to an eave of a building or other appropriate structure, for example a residential home or a commercial business. In many such embodiments, the luminaire 100, 200, 300 would typically be installed so that the front or light emitting side (as illustrated in FIGS. 1A, 1B, 2A, 2B, 3A, 3B, and 3C) would face downward, towards the ground. Thus, the rear side, which is illustrated in FIG. 3D, would typically be mounted against the eave with the rear side facing up.

In some embodiments, the luminaire 100, 200, 300 can be mounted to a wall or other vertically oriented structure or surface, and further to structures and surfaces that are slanted relative to horizontal. Various embodiments may be deployed in other indoor and outdoor applications, for example.

Each of the illustrated luminaires 100, 200, 300 comprises a respective housing 105 that comprises a platform 115. The term "platform," as used herein, generally refers to a raised surface or structure. Rotatable light modules 150 are set in respective apertures of the platform 115. Four rotatable light modules 150 are recessed in the platform 115 of the luminaire 100 illustrated in FIG. 1. Three rotatable light modules 150 are recessed in the platform 115 of the luminaire 200 illustrated in FIG. 2. Two rotatable light modules 150 are recessed in the platform 115 of the luminaire 300 illustrated in FIG. 3. In an example embodiment, each rotatable light module 150 is inlaid in the platform 115. A peripheral area of each rotatable light module 150 can maintain a parallel or coplanar orientation with the platform 115 during rotation, for example.

As will be discussed in further detail below, each light module 150 comprises a light emitting diode that can be a chip-on-board light emitting diode or one or more discrete light emitting diodes, for example.

As illustrated in FIG. 3A, the rotational path 190 of each rotatable light module 150 is about an axis 191 that extends through the platform 115. As will be discussed in further detail below, each rotatable light module 150 directs light laterally or sideways relative to the axis 191 of rotation. Accordingly, the optical axis of the rotatable light module 150 and the axis 191 of rotation of the rotatable light module 150 are skewed relative to one another and thus are typically oriented at an angle other than parallel. Rotating each rotatable light module 150 provides a user with a capability to aim the illumination pattern in a desired direction.

In the illustrated embodiments of FIGS. 1, 2, and 3, the rotatable light modules 150 are separately rotatable, for example during installation. An owner of a property at which the luminaire 100, 200, 300 is installed may also rotate the rotatable light modules 150 from time-to-time after installation, for example to provide illumination specific to an event or a task.

With the illumination pattern of each rotatable light module 150 diverging from its respective axis 191 of rotation, the overall illumination of the luminaire 100, 200, 300 can be readily configured via adjusting the rotational positions of the individual light modules 150. For example, when mounted above an area having three picnic tables, the three rotatable light modules 150 of the luminaire 200 could be individually rotated so that each illuminates one of the tables. The three rotatable light modules 150 of the luminaire 200 could also be individually rotated so that all three emit light in a common direction, for example to concentrate illumination on a single picnic table or on a work area, temporarily, for a task.

In some embodiments, the rotation is toothless. In some example embodiments, the rotation is infinitely adjustable. In some example embodiments, the rotation is by designated increments.

In some embodiments each rotatable light module 150 comprises a pointer that serves as a directional indicator of its illumination pattern. With such pointers, a user can conveniently rotate the rotatable light modules 150 to deliver illumination in one or multiple desired directions. For example, with the rotatable light modules 150 set to the rotational orientations shown in FIG. 2, the luminaire 200 will output three individual illumination patterns, each in a different direction.

In some example embodiments, a luminaire can incorporate light modules and/or luminaire technology in accordance with the teachings of U.S. patent application Ser. No. 13/829,014, entitled Three Axis Adjustment for Emergency Lights Emitting an Asymmetric Beam Patterns to Illustrate a Path of Egress and filed Mar. 14, 2013 in the name of Westly Davis Hetrick and Christopher Ladewig, the entire contents of which are hereby incorporated herein by reference. Thus, some embodiments of one or more of the luminaires 100, 200, 300 can incorporate one or more elements, features, teachings, or technologies disclosed in U.S. patent application Ser. No. 13/829,014.

In addition to the rotatable light modules 150, the example luminaire 100 illustrated in FIG. 1 comprises a motion detector 125 that is set in an aperture of the platform 115. In response to sensing movement, the motion detector 125 can activate the rotatable light modules 150 to emit light. In some example embodiments, the motion detector 125 provides omnidirectional sensing. Embodiments of the luminaire 100 may comprise other sensors that control light emission in response to various conditions in accordance with a wide range of applications. As illustrated in FIG. 1, the example luminaire 100 comprises punch-out sites 103 to accommodate such additional sensors or other components.

The example luminaire 200 illustrated in FIG. 2 also comprises punch-out sites 103 for mounting sensors and other elements as may be desired for customization. The luminaire 200 further comprises a large punch-out site for mounting a motion detector, should one be desired.

The example luminaire 300 illustrated in FIG. 3 comprises a user interface 325 that has an integrated motion detector. In an example embodiment, the user interface 325 is rotatable so that the integrated motion detector detects motion in a user-specified direction set by rotation. The user interface 325 comprises two knobs 301, 302 that a user can turn. The knob 301 sets the length of time that the luminaire 300 outputs light when motion is detected. The knob 302 sets motion detector sensitivity so that a user can set the level of detected motion needed to trigger the luminaire 300 to output light.

FIG. 3 further illustrates an example connectorized power cable 303 for supplying the luminaire 300 with electricity. A ground wire 304 is also provided so the luminaire 300 can be readily grounded during installation. As illustrated in FIG. 3D, the wiring is connected to the rear side of the luminaire 300, which can be mounted against an eave or other surface as discussed above. The rear side of the luminaire 300 comprises a cover 307 so that the luminaire 300 is closed on all sides for enhanced environmental protection, including against ingress of moisture, dust, and debris.

Turning now to FIG. 4, this figure is an illustration of a perspective view of a cross section of an example light emitting diode mounting system 400 for the luminaire 300 according to some example embodiments of the present disclosure. In FIG. 4, a cross section of the luminaire 300 is illustrated in the orientation shown in FIG. 3A. That is, so that the light emitting diode 175 would emit light up the page.

As illustrated, a light emitting diode holder 410 mounts the light emitting diode 175 against a heat sink 406, which may be formed of metal or other thermally conductive material and may comprise fins in some embodiments. The rear, non-emitting side of the light emitting diode 175 faces and is in thermal communication with the heat sink 406. Heat thus flows from the light emitting diode 175 into the heat sink 406, with the resulting thermal path leading away from the optic 150, which is shown in FIG. 3A and in FIG. 5, but removed from FIG. 4.

The light emitting diode holder 410 comprises an opening through which light from the light emitting diode 175 passes. A screw 413 fastens the light emitting diode holder 410 to the heat sink 406. The heat sink 406, the light emitting diode 175, and the light emitting diode holder 410 are thus in fixed positions relative to one another, with rotation coming from the associated optical element. A notch 405 in the light emitting diode holder 410 provides passage of an electrical supply lead to the light emitting diode 175.

Turning now to FIG. 5, this figure is an illustration of a perspective view of an example cross section of the example rotatable light module 150 mounted in an aperture of the example luminaire 300 in accordance with some embodiments of the present disclosure. In the illustrated cross section, the cover 307 has been removed from the rear side of the luminaire 300, the heat sink 405, and the electrical supply for the rotatable light module 150 have been eliminated from the view to avoid obstructing visibility of the illustrated features. As illustrated in FIG. 5, the luminaire 300 is vertically inverted relative to the orientation of FIG. 4.

In the illustrated embodiment, an optic 180 that is rotatable covers the light emitting diode 175 and provides environmental/moisture protection in addition to light manipulation. In the illustrated embodiment, the light emitting diode 175 faces and emits light into a cavity 181 of the optic 180. The light emitting diode holder 410 retains the light emitting diode 175 against the heat sink 406 (not illustrated in FIG. 5) as discussed above with respect to FIG. 4.

The optic 180 comprises an internally reflective reflector 185 that redirects light. The light emitting diode 175 emits light along an axis 192, and the internally reflective reflector 185 reflects across the light emitting diode axis 192 light that is incident on the reflector 185. In some example embodiments, the internally reflective reflector 185 can comprise a prism jutting from an outer surface of the optic 180. As illustrated, the internally reflective reflector 185 comprises a totally internally reflective surface 29. Via reflection and refraction, the illustrated optic 180 produces an illumination pattern that is skewed or biased relative to the optical axis 192 of the light emitting diode 175. The illumination pattern may further be skewed or biased relative to the axis of rotation 191 of the associated rotatable light module 150. In operation, the totally internally reflective surface 29 reflects light across the optical axis 192 of the light emitting diode 175 and across the axis of rotation 191 (shown on FIG. 3A) of the rotatable light module 150.

As will be discussed in further detail below, the optic 180 has an associated light-blocking shield 5 that is adjacent but separated from the totally internally reflective surface 29 by an air gap 28. The air gap 28 facilitates total internal reflection at the totally internally reflective surface 29.

In the illustrated embodiment, the light emitting diode 175 is stationary with respect to the optic 180 that rotates and thus may be characterized as a rotatable optic. In other words, the position of the light emitting diode 175 is fixed within the housing 105 of the luminaire 300 while the optic 180 rotates. Thus, the rotatable light module 150 may comprise a stationary light emitting diode 175 and a rotating optic. The optic 180 is set in an aperture 116 of the platform 115 and is rotatable about a central portion of the aperture 116, which is circular in the illustrated embodiment. In some embodiments, coupling a stationary light emitting diode 175 to a rotatable optic 180 provides an opportunity to utilize the luminaire housing 105 for thermal management, for example as a sink for heat generated by LED operation.

As illustrated, the optic 180 comprises a lip 13 that extends around a periphery of the optic 180 and has a diameter that is larger than the diameter of the aperture 116. Thus, the lip 13 captures the optic 180 in the aperture 116, keeping the optic 180 on the underside of the platform 115.

An anti-friction washer 6, which is an example of a ring, circumscribes the aperture 116 and is located between the lip 13 and the underside of the platform 115. A carrier tray 2 is fastened to the underside of the platform 115 with fasteners 77 so that the lip 13 is sandwiched between the carrier tray 2 and the underside of the platform 115. The carrier tray 2 includes an aperture 78 that is aligned with the aperture 116 in the platform. Thus, the optic 180 is aligned with both apertures 116, 78.

A gasket 3 is sandwiched between the lip 13 and the carrier tray 2 to provide a sealing surface 79 that blocks incursion of moisture, dust, and debris. The illustrated gasket 3 is one example embodiment of a ring. The carrier tray 2 and the underside of the platform 115 comprise a system of grooves and protrusions 76 that fit together so that the carrier tray 2 and the underside of the platform 115 are aligned and seated with one another.

In some example embodiments, the optic 180 comprises an optic available from Cooper Lighting (Peachtree City, Ga.) of Eaton Corporation under the trademark ACCULED OPTICS.

Turning now to FIGS. 6, 7, and 8, some example embodiments of the illustrated rotatable light module 150 will be described in further detail below.

Figure 6A:
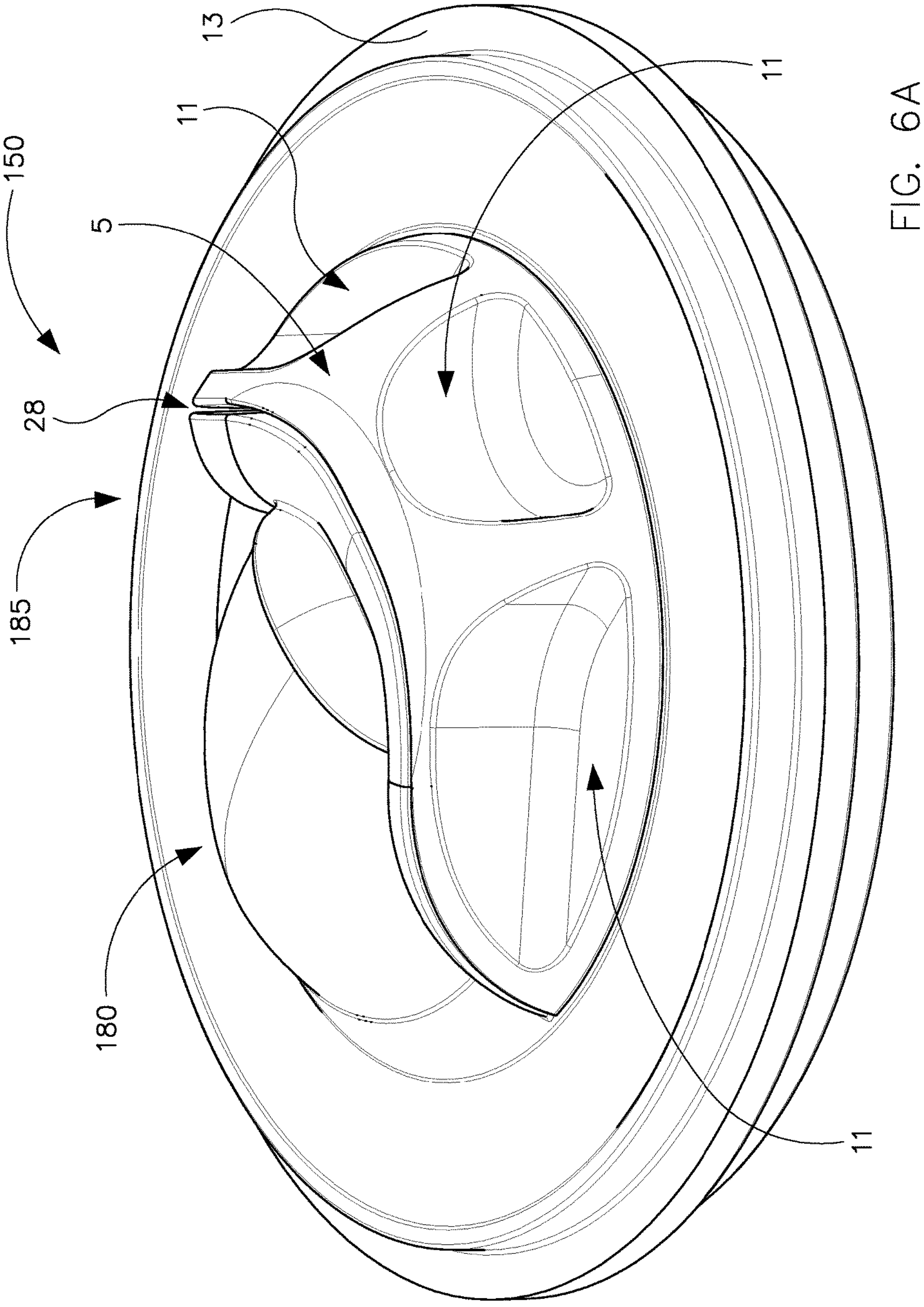

In accordance with some embodiments of the disclosure, FIG. 6A provides a perspective view of the rotatable light module 150, while FIG. 6B provides a plan view, FIG. 6C provides one side view, and FIG. 6D provides another side view. FIGS. 7A and 7B provide perspective illustrations of the rotatable light module 150 with and without the light-blocking shield 5, respectively, in accordance with some embodiments of the disclosure.

FIGS. 8A and 8B provide cross sectional views of the rotatable light module 150 with and without the light-blocking shield 5, respectively, with overlaid rays describing an example operation of the light-blocking shield 5 in accordance with some embodiments of the disclosure. In some applications, optical performance of a luminaire benefits from increasing the amount light emitted in one lateral direction while reducing light spillage in an opposing lateral direction. Additional benefit can be realized by using a rotatable light module 150 that concentrates the illumination in a particular, user-defined lateral direction. The embodiment of the rotatable light module 150 illustrated in FIGS. 6, 7, and 8 can address both of these objectives. In particular, the rotatable light module 150 incorporates the light-blocking shield 5. In the illustrated example embodiment, the light-blocking shield 5 comprises a single, external, permanently attached opaque element that not only suppresses unintended light traveling outside an aiming direction, but also redirects such light towards the aiming direction. As illustrated, the light-blocking shield 5 comprises finger-sized indentations 11 that serve as gripping features for easy manual rotation without a user touching refractive optical surfaces of the optic 180.

As illustrated, the optic 180 comprises a clear element, which may be formed from optical plastic for example, installed over the light emitting diode 175 as illustrated in FIG. 5 and discussed above. As illustrated in FIG. 8, the optic 180 produces illumination concentrated in a relatively tight angular zone. In some embodiments, the illumination may be concentrated so that over half of the illumination is within a range of substantially less than 180 degrees, for example. In some embodiments, the illumination may be concentrated within a range of approximately 120 degrees, for example. In some embodiments, the illumination may be concentrated within a range of approximately 100 degrees or less, for example.

As illustrated, the optic 180 is free to rotate a full 360 degrees so that a user can aim the beam toward a desired direction. A user may further rotate the optic 180 multiple revolutions clockwise or counterclockwise, for example. Light that the light emitting diode 175 emits opposite the desired direction is largely managed and redirected through total internal reflection of the optic 180.

To address spill light that bypasses the total internal reflection of the optic 180, the optic 180 comprises the light-blocking shield 5. The light-blocking shield 5 may be attached to the main, clear body of the optic 180 by fusion, welding, epoxy, fasteners, or other appropriate technology, for example. In an example embodiment, the light-blocking shield 5 comprises a high-reflectance diffuse material that avoids excessive light loss due to absorption. The light-blocking shield 5 can comprise opaque material. In some example embodiments, the light-blocking shield 5 comprises a molded plastic that is loaded with light-scattering material. In some example embodiments, the light-blocking shield 5 comprises a textured metal surface that diffusely reflects incident light.

FIG. 8A provides a cross section side view of the optic 180 without the light-blocking shield 5, showing a raytrace plane in which the rear side of the optic 180 is not completely reflecting all incident light through total internal reflection. The rays of light are spilling out the rear of the optic 180 in an unintended direction.

FIG. 8B provides a cross section side view of the optic 180 with the light-blocking shield 5, also showing a raytrace plane in which the rear side of the optic 180 is not completely reflecting all incident light through total internal reflection. However, the rays of light are reflected by the light-blocking shield and redirected toward the forward zone, rather than spilling out the rear in an unintended direction.

As illustrated in FIG. 8B, light rays that penetrate the totally internally reflective surface 29 propagate through the air gap 28 and are incident on the light-blocking shield 5. The light-blocking shield 5 reflects the incident light rays. The reflected light rays propagate back through the air gap 28 and into the optic 180. The optic 180 then returns the redirected light rays in the direction that the user desires.

In addition to its optical function, the light-blocking shield 5 provides an ergonomic grip for a user to rotate the optic 180 is as desired. In the illustrated embodiment, the light-blocking shield 5 comprises three indentations 11 that are sized to receive a user's fingertips to facilitate manual rotation. Thus in some embodiments, the indentations 11 can be characterized as finger receptacles.

Turning now to FIG. 9, this figure illustrates a perspective of an example luminaire 900 comprising three recessed light modules 901, 902, 903 according to some embodiments of the present disclosure. The luminaire 900 is configured for overhead mounting, such as on an eave of a house or other building or structure.

Each of the recessed light modules 901, 902, 903 comprises a light emitting diode mounted at the rear of a reflective cavity. The reflective cavities can be formed from reflective panels mounted to a frame 905, for example.

In an example embodiment, the reflective panels are formed so that the cavities emit light in a preferential lateral direction, resulting in an overall illumination pattern 913 that is biased to one side of the luminaire 900. As illustrated, one edge 911 of the illumination pattern 913 is directed more toward the ground than the other edge 912. That is, the edge 912 spreads horizontally more than the edge 911. The edge 911 may face the house, while the edge 912 is projects towards a yard to extend illumination coverage into the yard.

Turning now to FIG. 10, views of an example luminaire 100 comprising two example light modules 1050 are illustrated in accordance with some embodiments of the present disclosure. FIG. 10B illustrates the luminaire 110 with reflectors 1055, while FIG. 10A illustrates the luminaire 110 without the reflectors 1055. FIGS. 10C and 10D provide magnified views of the light module 1050, respectively without and with the reflector 1055.

In the illustrated embodiment, the light module 1050 is flat and recessed within the platform 115 of the luminaire 1000. The recessed light modules 1050 are typically fixed in position in the platform 115. In an example embodiment, light emits from each light module 1050 in a pattern that is substantially rotationally symmetric about an optical axis.

In an example embodiment, each light module 1050 comprises one or more light emitting diodes 175 (not visible in FIG. 10) and a cover lens 1051 or other optical element.

As illustrated in FIGS. 10B and 10D, each light module 1050 has an associated reflector 1055 that directs emitted light laterally. A user can aim the emitted light in one or more selected directions by rotating the reflectors 1055 around a periphery of the associated recessed light module 1050 as desired. The user may thus produce customized patterns of light as discussed above with reference to FIGS. 1 through 8. As an alternative to being rotatable, in some embodiments, the reflectors 1055 are set in fixed positions during manufacture of the luminaire 1000.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A luminaire comprising:

a frame comprising an environmentally exposed surface, with a plurality of apertures formed in the environmentally exposed surface; and a plurality of light modules, wherein each light module is mounted to the frame along the environmentally exposed surface in a respective aperture of the plurality of apertures, is rotatable about a respective light emitting diode optical axis that extends through the respective aperture, is environmentally exposed, and comprises:

an optic disposed to direct light off of the respective light emitting diode optical axis, the optic comprising a lip;

a gasket that provides environmental protection;

an anti-friction washer, wherein the lip of the optic is sandwiched between the gasket and the anti-friction washer; and an opaque member that is attached to the optic and that comprises gripping features for manual rotation of the optic relative to the respective light emitting diode optical axis by a user after installation of the luminaire.

2. The luminaire of claim 1, wherein the optic comprises a refractive surface and a reflective surface to provide a pattern of illumination that is biased relative to the light emitting diode optical axis.

3. The luminaire of claim 1, further comprising a motion detector mounted to the frame.

4. The luminaire of claim 1, wherein the gripping features comprise finger-sized indentations.

5. The luminaire of claim 1, wherein the light emitting diode optical axis is substantially perpendicular to the environmentally exposed surface.

6. The luminaire of claim 1, wherein the luminaire comprises a chip-on-board light emitting diode positioned to emit light into the optic.

7. The luminaire of claim 1, wherein the gripping features are configured to avoid the user touching a refractive optical surface of the optic during the manual rotation.

8. The luminaire of claim 1, wherein the frame further comprises a plurality of first rims associated with the plurality of apertures, wherein the luminaire further comprises a tray comprising a plurality of second apertures and a plurality of second rims, each second rim associated with a second aperture of the plurality of second apertures, wherein the tray is disposed so that the plurality of second apertures are aligned with the plurality of apertures formed in the environmentally exposed surface, and wherein the lip of the optic, the anti-friction washer, and the gasket are disposed between one of the first rims and one of the second rims.

9. The luminaire of claim 1, wherein each light module is environmentally sealed for exterior environments.

10. The luminaire of claim 1, wherein the environmentally exposed surface comprises a platform, and wherein the platform comprises the plurality of apertures.

11. The luminaire of claim 1, wherein the environmentally exposed surface comprises a platform.

12. A luminaire comprising:

a platform; and a plurality of light modules that are individually set into respective apertures of the platform and that are individually rotatable, wherein each light module comprises a rotatable optic that comprises a lip that extends around a periphery of the rotatable optic, that receives light from a respective light emitting diode that is stationary, and that is disposed adjacent a rim of one of the respective apertures, with an anti-friction washer disposed between the lip and the rim, wherein the anti-friction washer is operative to reduce friction associated with rotation of the rotatable optic after installation of the luminaire, wherein the luminaire further comprises a tray that comprises second apertures that are aligned with the respective apertures, each second aperture having a second rim, and wherein for each light module, a respective gasket extends around the periphery of the rotatable optic, with the lip disposed between the anti-friction washer and the gasket, and with the gasket disposed between the lip and the second rim.

13. The luminaire of claim 12, wherein each light module comprises a respective reflector for directing light across a respective axis of rotation to provide an illumination pattern that is biased relative to the respective axis of rotation.

14. The luminaire of claim 12, wherein each of the plurality of light modules is environmentally sealed with the respective gasket for outdoor deployment.

15. A luminaire comprising:

a platform comprising an aperture and a first rim that extends about the aperture;

a light emitting diode disposed adjacent or in the aperture;

a rotatable optic disposed at least partially in the aperture to receive light from the light emitting diode, the rotatable optic comprising a lip that extends around a periphery of the rotatable optic, the rotatable optic operable to direct the received light off axis relative to an axis of rotation;

a gasket disposed at the aperture for blocking incursion of moisture, dust, and debris;

an anti-friction washer disposed at the aperture for reducing friction associated with rotation of the rotatable optic;

a member comprising a second aperture and a second rim that extends about the second aperture; and an opaque light-blocking shield that is attached to the rotatable optic and that comprises gripping features for manual rotation of the rotatable optic after installation of the luminaire, wherein the lip of the rotatable optic is disposed between the anti-friction washer and the gasket, and wherein the lip of the rotatable optic, the anti-friction washer, and the gasket are disposed between the rim and the second rim.

16. The luminaire of claim 15, wherein the light emitting diode is stationary relative to rotation of the rotatable optic, and wherein the luminaire further comprises a sensor operative to activate the light emitting diode in response to sensing a condition.

17. The luminaire of claim 16, wherein the rotatable optic comprises a cavity facing the light emitting diode and a prism that juts from the optic opposite the cavity, wherein the aperture is one of a plurality of apertures in the platform, wherein the light emitting diode is one of a plurality of light emitting diodes disposed adjacent the plurality of apertures, and wherein the rotatable optic is one of a plurality of rotatable optics disposed at least partially in the plurality of apertures.

* * * * *